US007511810B2

(12) United States Patent
Kondo et al.

(10) Patent No.: US 7,511,810 B2
(45) Date of Patent: Mar. 31, 2009

(54) PLASMA GENERATING ELECTRODE INSPECTION DEVICE

(75) Inventors: Atsuo Kondo, Okazaki (JP); Yasumasa Fujioka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 231 days.

(21) Appl. No.: 11/727,154

(22) Filed: Mar. 23, 2007

(65) Prior Publication Data

US 2007/0229808 A1 Oct. 4, 2007

(30) Foreign Application Priority Data

Mar. 29, 2006 (JP) ............................ 2006-091931

(51) Int. Cl.
*G01J 3/30* (2006.01)

(52) U.S. Cl. ...................................................... 356/313

(58) Field of Classification Search ....................... None
See application file for complete search history.

(56) References Cited

U.S. PATENT DOCUMENTS 5,746,954 A * 5/1998 Aikman, Jr. .................. 264/87
7,280,202 B2 * 10/2007 Okumura et al. ............ 356/313

* cited by examiner

*Primary Examiner*—Kara E Geisel
*Assistant Examiner*—Juan D Valentin
(74) *Attorney, Agent, or Firm*—Oliff & Berridge, PLC

(57) ABSTRACT

The present invention provides a plasma generating electrode inspection device capable of efficiently inspecting the parallelism, flatness, surface roughness, and dielectric strength of a plasma generating electrode. A plasma generating electrode inspection device 100 includes a reference quartz plate 2 provided with a film-shaped transparent conductor 1 disposed on one surface (outer surface 2*a*), a reference spacer 3 disposed on the outer edge of the other surface (inner surface 2*b*) of the reference quartz plate 2, a reference clamper 4 which can secure a plasma generating electrode 11 as an inspection target between the reference spacer 3 and the reference clamper 4, and a pulse power supply 5 capable of applying a pulse voltage between the transparent conductor 1 and the plasma generating electrode 11 as an inspection target while changing the voltage.

5 Claims, 1 Drawing Sheet

PLASMA GENERATING ELECTRODE INSPECTION DEVICE

BACKGROUND OF THE INVENTION

1. Field of the Invention

The present invention relates to a plasma generating electrode inspection device. More particularly, the present invention relates to a plasma generating electrode inspection device capable of efficiently inspecting the parallelism, flatness, surface roughness, and dielectric strength of a plasma generating electrode.

2. Description of Related Art

A silent discharge occurs when disposing a dielectric between two electrodes and applying a high alternating voltage or a periodic pulse voltage between the electrodes. In the resulting plasma field, active species, radicals, and ions are produced to promote reaction and decomposition of gases. This phenomenon may be utilized to remove toxic components contained in engine exhaust gas or incinerator exhaust gas. Therefore, a plasma generating device has been developed in order to process engine exhaust gas and the like.

In such a plasma generating device, the state of generated plasma varies when the state of an electrode for generating plasma (plasma generating electrode) varies. Therefore, it is necessary to eliminate the difference between individual plasma generating electrodes during production.

As the factors determining the state of the plasma generating electrode, parallelism, flatness, surface roughness, dielectric strength, and the like can be given. In a related-art method, parallelism is measured using a micrometer, flatness is measured using a three-dimensional shape measuring device, surface roughness is measured using a surface roughness tester, and dielectric strength is measured using a dielectric strength measuring device, for example. Specifically, the above factors are separately evaluated using different measuring methods.

SUMMARY OF THE INVENTION

A related-art measuring method has a problem in which evaluation takes time by separately conducting measurements, thereby increasing evaluation cost.

The present invention has been achieved in view of the above problem. An object of the present invention is to provide a plasma generating electrode inspection device capable of efficiently inspecting the parallelism, flatness, surface roughness, and dielectric strength of a plasma generating electrode.

In order to achieve the above object, the present invention provides the following plasma generating electrode inspection device.

[1] A plasma generating electrode inspection device comprising: a reference quartz plate provided with a film-shaped transparent conductor disposed on one surface (outer surface); a reference spacer disposed on an outer edge of the other surface (inner surface) of the reference quartz plate; a reference clamper which secures a plasma generating electrode as an inspection target between the reference spacer and the reference clamper; and a pulse power supply capable of applying a pulse voltage between the transparent conductor and the plasma generating electrode as an inspection target while changing the voltage.

[2] The plasma generating electrode inspection device according to [1], further comprising a CCD camera capable of observing a plasma generation state from outside through the transparent conductor.

[3] The plasma generating electrode inspection device according to [1] or [2], wherein parallelism between the inner surface and the outer surface of the reference quartz plate is 100λ or less, and the inner surface and the outer surface respectively have a flatness of 10λ or less.

[4] The plasma generating electrode inspection device according to any one of [1] to [3], wherein the reference spacer has a parallelism between a surface contacting the reference quartz plate and a surface contacting the plasma generating electrode as an inspection target of 100λ or less, and the surface contacting the reference quartz plate and the surface contacting the plasma generating electrode as an inspection target respectively have a flatness of 10λ or less.

[5] The plasma generating electrode inspection device according to any one of [1] to [4], wherein a surface of the reference clamper contacting the plasma generating electrode as an inspection target has a flatness of 10λ or less.

Since the plasma generating electrode inspection device according to the present invention includes the reference quartz plate provided with the film-shaped transparent conductor disposed on one surface (outer surface), the reference spacer disposed on the outer edge of the other surface (inner surface) of the reference quartz plate, the reference clamper which secures the plasma generating electrode as an inspection target between the reference spacer and the reference clamper, and the pulse power supply capable of applying a pulse voltage between the transparent conductor and the plasma generating electrode as an inspection target while changing the voltage, the parallelism, flatness, surface roughness, and dielectric strength of the plasma generating electrode can be inspected in a short time by applying a pulse voltage in a state in which the plasma generating electrode is placed between the reference quartz plate and the reference clamper while changing the voltage, and observing the luminous intensity distribution of plasma through the transparent conductor.

DETAILED DESCRIPTION OF PREFERRED EMBODIMENTS

Figure 1:
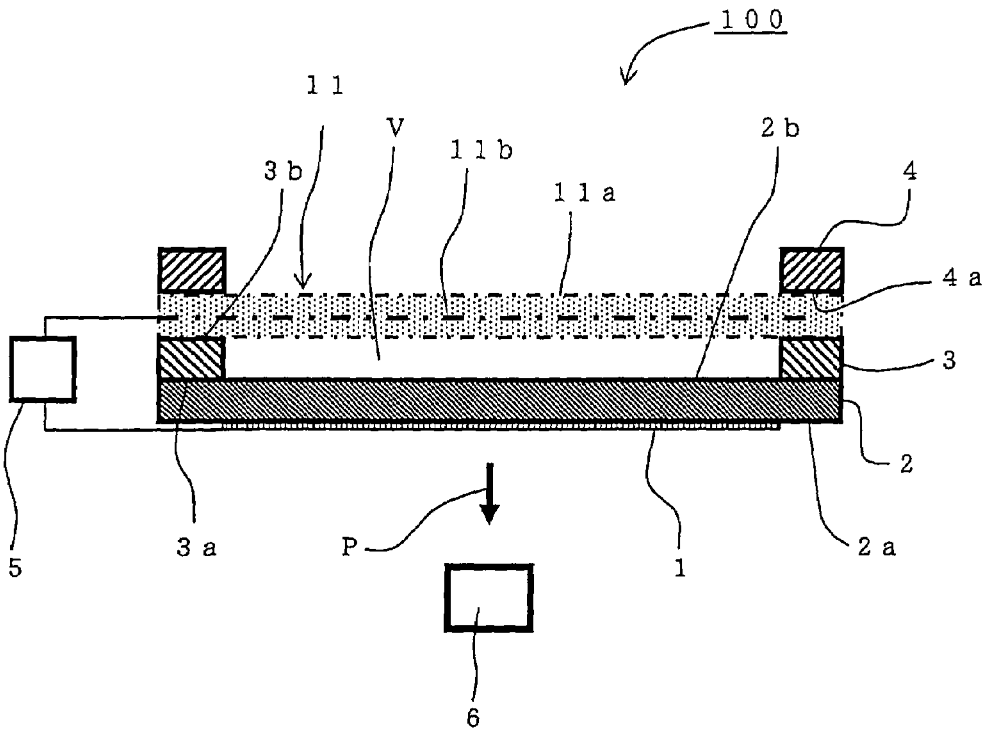
FIG. 1 is a cross-sectional view schematically showing a plasma generating electrode inspection device according to one embodiment of the present invention.

Embodiments of the present invention are described below in detail with reference to the drawing. Note that the present invention is not limited to the following embodiments. Various modifications and improvements of the design may be made without departing from the scope of the present invention based on common knowledge of a person skilled in the art.

As shown in FIG. 1, a plasma generating electrode inspection device according to one embodiment of the present invention includes a reference quartz plate 2 provided with a film-shaped transparent conductor 1 disposed on one surface (outer surface 2*a*), a reference spacer 3 disposed on the outer edge of the other surface (inner surface 2*b*) of the reference quartz plate 2, a reference clamper 4 which secures a plasma generating electrode 11 as an inspection target between the reference spacer 3 and the reference clamper 4, and a pulse power supply 5 capable of applying a pulse voltage between the transparent conductor 1 and the plasma generating electrode 11 as an inspection target while changing the voltage. FIG. 1 is a cross-sectional view schematically showing the plasma generating electrode inspection device according to one embodiment of the present invention along a plane perpendicular to the reference quartz plate 2.

When inspecting a plasma generating electrode using the plasma generating electrode inspection device 100 according to this embodiment, the plasma generating electrode 11 as an inspection target is placed between the reference spacer 3 and the reference clamper 4. A space V is formed by the reference quartz plate 2, the plasma generating electrode 11, and the reference spacer 3. When applying a pulse voltage between the transparent conductor 1 and the plasma generating electrode 11 as an inspection target from the pulse power supply 5, plasma is generated in the space V Light emitted by plasma can be observed through the transparent conductor 1. In this case, when applying the pulse voltage while changing the voltage, plasma starts to be generated from a portion in which plasma is easily generated when increasing the pulse voltage from a low voltage to a high voltage, for example. The difference between a portion on the plasma generating electrode 11 in which plasma is easily generated and a portion on the plasma generating electrode 11 in which plasma is generated to only a small extent is observed as the plasma light emission state. Specifically, when the plasma generating electrode 11 exhibits poor parallelism, flatness, or surface roughness, plasma is generated to a different extent. This is observed as different luminous intensities on the surface of the plasma generating electrode 11. On the other hand, when the plasma generating electrode 11 exhibits excellent parallelism, flatness, and surface roughness, a uniform luminous intensity is observed on the surface of the plasma generating electrode 11. Since a nonuniform luminous intensity distribution occurs when the plasma generating electrode 11 exhibits poor parallelism or the like, acceptance or rejection of the plasma generating electrode 11 can be determined by the extent of the distribution.

It is preferable that the reference quartz plate 2 forming the plasma generating electrode inspection device 100 according to this embodiment have a parallelism between the inner surface 2*b* and the outer surface 2*a* of 100λ or less, and more preferably 50λ or less. Note that 1λ is 633 nm. If the parallelism exceeds 100λ, it may be difficult to generate uniform light by plasma even if the plasma generating electrode 11 exhibits excellent parallelism and the like. The parallelism may be measured using a micrometer or the like. It is preferable that the inner surface 2*b* and the outer surface 2*a* of the reference quartz plate 2 respectively have a flatness of 10λ or less, and more preferably 5λ or less. If the flatness exceeds 10λ, it is difficult to accurately measure the parallelism and the like even if the plasma generating electrode 11 exhibits excellent parallelism and the like. The term "flatness" used herein refers to a value indicated by profile irregularity (reflected wave profile irregularity). The term "flatness" indicates the difference between the highest point and the lowest point on the surface in the effective range, and is a value when the wavelength of a light source of a laser interferometer used for profile irregularity measurement is 1λ. Note that 1λ is 633 nm. The profile irregularity may be measured using a laser interferometer G102 manufactured by Fuji Photo Film Co., Ltd. or the like.

The dimensions of the reference quartz plate 2 are not particularly limited. It is preferable that the reference quartz plate 2 have dimensions of about 30 mm×30 mm to 300 mm×300 mm. The thickness of the reference quartz plate 2 is not particularly limited. It is preferable that the reference quartz plate 2 have a thickness of 3 to 20 mm.

The transparent conductor 1 forming the plasma generating electrode inspection device 100 according to this embodiment is disposed on the outer surface 2*a* of the reference quartz plate 2. The transparent conductor 1 is used as a plasma generating electrode of the plasma generating electrode inspection device 100. Plasma is generated in the area in which the transparent conductor 1 is disposed. Therefore, when inspecting the plasma generating electrode 11 as an inspection target by generating plasma throughout the entire space V, it is preferable that the transparent conductor 1 be sized to cover the entire space V, as shown in FIG. 1. The thickness of the transparent conductor 1 is preferably 1 to 1000 μm, and more preferably 3 to 50 μm. If the thickness of the transparent conductor 1 is less than 1 μm, the conductor resistance of the electrode is increased, whereby the transparent conductor may generate heat and break (holes may be formed). If the thickness of the transparent conductor 1 exceeds 1000 μm, a uniform transparent conductive film may not be obtained, whereby plasma may be nonuniformly generated. As examples of the material for the transparent conductor 1, indium tin oxide (ITO) and the like can be given. The thickness distribution of the transparent conductor 1 is preferably ±5% or less, and more preferably ±3% or less. If the thickness distribution is great, it may be difficult to generate uniform plasma. The term "thickness distribution" used herein refers to a thickness distribution within the effective surface and is calculated by "(maximum thickness−minimum thickness)/(maximum thickness+minimum thickness)×100".

It is preferable that the reference spacer 3 forming the plasma generating electrode inspection device 100 according to this embodiment have a parallelism between a surface 3*a* contacting the reference quartz plate 2 and a surface 3*b* contacting the plasma generating electrode 11 as an inspection target of 100λ or less, and more preferably 50λ or less. If the parallelism is greater than 100λ, it may be difficult to generate uniform light by plasma even if the plasma generating electrode 11 exhibits excellent parallelism and the like. It is preferable that the surface 3*a* contacting the reference quartz plate 2 and the surface 3*b* contacting the plasma generating electrode 11 as an inspection target respectively have a flatness of 10λ or less, and more preferably 5λ or less. If the flatness exceeds 10λ, it may be difficult to generate uniform light by plasma even if the plasma generating electrode 11 exhibits excellent parallelism and the like.

It is preferable that the reference spacer 3 be a frame member formed to enclose the outer edge of the inner surface 2*b* of the reference quartz plate 2. This allows the space V to be formed by the reference quartz plate 2, the reference spacer 3, and the plasma generating electrode 11. The thickness of the reference spacer 3 is not particularly limited. Since the thickness of the reference spacer 3 is equal to the thickness of the space V in which plasma is generated, the thickness of the reference spacer 3 is preferably 0.5 to 5 mm in order to allow the generated plasma to be in a state suitable for inspection.

The material for the reference spacer 3 is not particularly limited insofar as the material exhibits insulating properties. Quartz, alumina, and the like are preferable as the material for the reference spacer 3.

With regard to the reference clamper 4 forming the plasma generating electrode inspection device 100 according to this embodiment, it is preferable that a surface (clamper surface) 4*a* of the reference clamper 4 contacting the plasma generating electrode 11 as an inspection target have a flatness of 10λ or less, and more preferably 5λ or less. If the flatness exceeds 10λ, it may be difficult to generate uniform light by plasma even if the plasma generating electrode 11 exhibits excellent parallelism and the like.

The shape of the reference clamper 4 is not particularly limited insofar as the reference clamper 4 can stably secure the plasma generating electrode 11. It is preferable that the reference clamper 4 be a frame member formed to enclose the outer edge of the reference quartz plate 2 along the reference spacer 3. The reference clamper 4 may be a member which secures three sides of the plasma generating electrode 11 instead of a frame member which encloses all sides of the plasma generating electrode 11. The reference clamper 4 may be two rod-like members which secure two opposite sides of the plasma generating electrode 11. This allows the plasma generating electrode 11 to be placed between the reference spacer 3 and the reference clamper 4 to secure the plasma generating electrode 11. The thickness of the reference clamper 4 is not particularly limited. It is preferable that the reference clamper 4 have a thickness of 0.5 to 10 mm. When horizontally disposing the reference quartz plate 2 and disposing the plasma generating electrode 11 on the reference quartz plate 2, it suffices to merely place the reference clamper 4 on the plasma generating electrode 11.

The material for the reference clamper 4 is not particularly limited insofar as the material exhibits insulating properties. Quartz, alumina, and the like are preferable as the material for the reference clamper 4.

The pulse power supply 5 forming the plasma generating electrode inspection device 100 according to this embodiment is not particularly limited insofar as the pulse power supply 5 can apply a pulse voltage between the plasma generating electrode 11 and the transparent conductor 1 as electrodes while changing the voltage (sweeping) to generate plasma in the space V It is preferable to change the energy supplied when applying the pulse voltage while changing the voltage in the range of 0 to 300 mJ. The pulse number is preferably 0.1 to 10 kHz.

It is preferable that the plasma generating electrode inspection device 100 according to this embodiment further include a CCD camera 6 capable of observing the plasma light emission state from the outside through the transparent conductor 1. It becomes possible to use the acquired data for various types of analysis such as image analysis by observing light emitted by plasma using the CCD camera 6, whereby the plasma generating electrode can be efficiently inspected. In FIG. 1, an arrow P indicates a state in which light emitted by plasma has exited the plasma generating electrode inspection device 100 through the transparent conductor 1.

A method of manufacturing the plasma generating electrode inspection device 100 according to this embodiment is described below.

The reference quartz plate 2 is preferably obtained by cutting quartz into a plate with specific dimensions, and optically polishing both surfaces of the plate to a specific parallelism and flatness.

A metal shadow mask or the like is disposed on one surface (outer surface 2*a*) of the resulting reference quartz plate 2 to specify a region in which the transparent conductor is disposed, and a specific metal is disposed in this region in the shape of a film. For example, a method of forming an ITO film using an electron-beam deposition method may be employed.

When forming the reference spacer 3, a specific material is formed in the shape of a frame along the outer edge of the inner surface 2*b* of the reference quartz plate 2. It is preferable to optically polish the surfaces 3*a* and 3*b* so that the parallelism between the surface 3*a* contacting the reference quartz plate 2 and the surface 3*b* contacting the plasma generating electrode 11 as an inspection target and the flatness of the surfaces 3*a* and 3*b* fall within specific ranges. The resulting reference spacer 3 is disposed on the outer edge of the inner surface 2*b* of the reference quartz plate 2 using an adhesive with a very low viscosity so that a thin and uniform adhesive layer is formed.

It is preferable to form the reference clamper 4 by forming a specific material into a specific shape, and optically polishing the material so that the flatness of the clamper surface 4*a* falls within a specific range.

As the pulse power supply 5, it is preferable to utilize a pulse power supply using an SI thyristor, an IGBT, or the like. The pulse power supply 5 is formed so that one terminal can be electrically connected with the transparent conductor 1 and the other terminal can be electrically connected with the plasma generating electrode 11 during inspection.

As the CCD camera 6, a generally-used CCD camera may be used.

A method of inspecting the plasma generating electrode 11 using the plasma generating electrode inspection device 100 according to this embodiment is as follows. For example, when inspecting the plasma generating electrode 11 in which a conductive film 11*b* is provided in a sheet-shaped ceramic dielectric 11*a*, the plasma generating electrode inspection device 100 is installed so that the reference quartz plate 2 is horizontally placed, the plasma generating electrode 11 is placed on the reference spacer 3, and the reference clamper 4 is placed on the plasma generating electrode 11. The pulse power supply 5 is connected with the transparent conductive film 1 and the conductive film 11*b* of the plasma generating electrode 11. A pulse voltage is applied from the pulse power supply 5 while changing the voltage, and the plasma generation state is observed with the naked eye, using a CCD camera, or the like. Acceptance or rejection of the plasma generating electrode is determined by analyzing the in-plane luminous intensity distribution. If the in-plane luminous intensity distribution when increasing and decreasing the voltage is less than 10%, the plasma generating electrode has excellent parallelism, flatness, and surface roughness. When an abnormal discharge such as an arc discharge has occurred when increasing and decreasing the voltage, the plasma generating electrode has poor dielectric strength. The space V may be filled with air during inspection. It is preferable to fill the space V with nitrogen. The dew point of the nitrogen is preferably −50 to 0° C. The temperature inside the space V during inspection is preferably 25 to 200° C. The method of changing the pulse voltage is not particularly limited. For example, a method may be employed which includes gradually increasing a voltage in a state in which a voltage is not applied, gradually decreasing the voltage when a specific voltage has been reached, and then terminating application of the voltage. The maximum value to be reached when increasing the voltage is preferably 4 to 40 kV. The voltage increase rate and the voltage decrease rate are not particularly limited. The voltage increase rate and the voltage decrease rate are preferably 0.5 to 20 kV/min.

EXAMPLES

The present invention is described below in more detail by way of examples. Note that the present invention is not limited to the following examples.

Example 1

A plasma generating electrode inspection device 100 as shown in FIG. 1 was produced. As the reference quartz plate 2, an optically polished product of which both sides had a flatness (profile irregularity) of 1λ was used (1λ=633 nm). The reference quartz plate 2 had dimensions of 150×150×7 mm. An ITO film (transparent conductor 1) with dimensions of 80×50 mm was formed on one side of the reference quartz plate 2 by an electron-beam deposition method using a metal shadow mask. The thickness of the ITO film was 3 μm in the electrode area, and the thickness distribution was ±3% or less. As the reference spacer 3, an optically polished product (0.7 mm) of which both sides had a flatness of 1λ was used. A quartz clamper of which both sides had a flatness of 1λ was provided. The pressure of the clamp was adjusted using a gauge so that the pressure became constant. As the pulse power supply 5, a pulse power supply utilizing an SI thyristor was used. The plasma generation state was observed using a CCD camera.

An alumina dielectric electrode (plasma generating electrode) in which a tungsten conductive film was provided was disposed on the resulting plasma generation device and clamped to form a plasma generating space. The alumina dielectric electrode had dimensions of 90×60×1 mm and had an electrode film with dimensions of 80×50 mm provided therein. The thickness of the electrode film was 10 μm. The conductor portion of the alumina dielectric electrode was aligned with the ITO film formed on quartz to form a parallel space.

The space was filled with nitrogen having a dew point of −20° C. or less while adjusting the temperature at 60° C.±1° C. A pulse voltage (cycle: 100 Hz, pulse width: 3 microseconds) applied to the electrodes was gradually increased from 0 kV to 15 kV at a rate of 15 kV/min and then decreased to 0 kV at a rate of −15 kV/min. Plasma light emission (mainly luminescence in the ultraviolet region) was photographed using a CCD camera through the ITO film, and the luminous intensity was analyzed using the resulting image. The plasma generating electrode was evaluated by image analysis according to the following criteria. Specifically, a plasma generating electrode in which an in-plane luminous intensity distribution of 10% or more occurred when increasing and decreasing the voltage was determined to be defective, and a plasma generating electrode in which an abnormal discharge such as an arc discharge occurred when increasing and decreasing the voltage was also determined to be defective due to poor dielectric strength. The above plasma generating electrode did not show abnormalities.

As described above, performance such as parallelism, flatness, and surface roughness required for a plasma electrode can be evaluated by evaluating the uniformity of discharge luminescence, that is, evaluating the in-plane luminous intensity distribution by applying a pulse voltage between the electrodes while increasing the voltage (sweeping) and photographing the plasma light emission state using a CCD camera. Moreover, since the dielectric strength of the dielectric can be measured at the same time, the inspection time can be significantly reduced, whereby cost can be reduced.

The plasma generating electrode inspection device according to the present invention can be utilized to evaluate the performance of a plasma generating electrode, and can efficiently inspect parallelism, flatness, surface roughness, and dielectric strength.

What is claimed is:

1. A plasma generating electrode inspection device comprising:

a reference quartz plate provided with a film-shaped transparent conductor disposed on one surface (outer surface);

a reference spacer disposed on an outer edge of the other surface (inner surface) of the reference quartz plate;

a reference clamper which secures a plasma generating electrode as an inspection target between the reference spacer and the reference clamper; and a pulse power supply capable of applying a pulse voltage between the transparent conductor and the plasma generating electrode as an inspection target while changing the voltage.

2. The plasma generating electrode inspection device according to claim 1, further comprising a CCD camera capable of observing a plasma generation state from outside through the transparent conductor.

3. The plasma generating electrode inspection device according to claim 1, wherein parallelism between the inner surface and the outer surface of the reference quartz plate is 100λ or less, and the inner surface and the outer surface respectively have a flatness of 10λ or less.

4. The plasma generating electrode inspection device according to claim 1, wherein the reference spacer has a parallelism between a surface contacting the reference quartz plate and a surface contacting the plasma generating electrode as an inspection target of 100λ or less, and the surface contacting the reference quartz plate and the surface contacting the plasma generating electrode as an inspection target respectively have a flatness of 10λ or less.

5. The plasma generating electrode inspection device according to claim 1, wherein a surface of the reference clamper contacting the plasma generating electrode as an inspection target has a flatness of 10λ or less.

* * * * *